(12) United States Patent  
Hardin

(10) Patent No.: US 7,540,096 B2  
(45) Date of Patent: Jun. 2, 2009

(54) VACUUM-ACTUATED SPHEROMETER

(75) Inventor: Larry C. Hardin, Bandon, OR (US)

(73) Assignee: Hardin Optical Co., Bandon, OR (US)

( * ) Notice: Subject to any disclaimer, the term of this patent is extended or adjusted under 35 U.S.C. 154(b) by 43 days.

(21) Appl. No.: 11/903,401

(22) Filed: Sep. 20, 2007

(65) Prior Publication Data  
US 2009/0077824 A1 Mar. 26, 2009

(51) Int. Cl.  
*G01B 5/22* (2006.01)  
*G01B 13/16* (2006.01)

(52) U.S. Cl. .............................. 33/556; 33/507; 33/551; 33/DIG. 2

(58) Field of Classification Search .................. 33/507, 33/549, 551, 552, 555, 556, 837, DIG. 2; 73/37.5  
See application file for complete search history.

(56) References Cited

U.S. PATENT DOCUMENTS

| 2,618,964 A | * | 11/1952 | Byrkett | 73/37 |
| 2,695,515 A | * | 11/1954 | Ward et al. | 73/37 |
| 3,266,951 A | * | 8/1966 | Vordahl | 148/421 |
| 3,315,367 A | * | 4/1967 | Walsh et al. | 33/544.5 |
| 3,744,135 A | * | 7/1973 | Gebel | 33/556 |
| 3,889,431 A | * | 6/1975 | Johnson | 451/42 |
| 4,221,053 A | * | 9/1980 | Bobel et al. | 33/552 |
| 4,854,156 A | * | 8/1989 | Hoeffel et al. | 73/37.5 |
| 5,131,159 A | | 7/1992 | Takahashi et al. | |
| 6,499,368 B2 | * | 12/2002 | Arms et al. | 33/556 |

FOREIGN PATENT DOCUMENTS

JP 2003185403 A * 7/2003  
SU 1686304 A1 * 10/1991

OTHER PUBLICATIONS

3B Scientific GMBH, 3B Physics Experiment (UE 101010), Jun. 2006, pp. 1-2, 3B Scientific Gmbh, Hamburg, Germany (found at URL www.3bscientific.hu/experiments/enUE101010_E.pdf).

(Continued)

*Primary Examiner*—R. A. Smith  
(74) *Attorney, Agent, or Firm*—Chernoff, Vilhauer, McClung, Stenzel, LLP

(57) ABSTRACT

A spherometer for measuring at least one physical parameter of the workpiece includes at least on fluid-actuated linearly extensible probe member having an output indicative of an amount of linear travel and a chamber housing the linearly extensible probe member. The chamber has an aperture for supporting a workpiece and a vacuum line is coupled to the chamber for creating a vacuum. The probe member is activated as a result of the vacuum in the chamber, causing it to extend linearly toward the workpiece until touching it. The linear extension of the probe may be used as a measurement of distance. The distance measured to a workpiece may be compared to a standard to determine a physical parameter of the workpiece.

10 Claims, 3 Drawing Sheets

OTHER PUBLICATIONS

University of Illinois, Measuring the Radius of Curvature by Means of a Spherometer (Physics 371 course handout), Sep. 1993, pp. 1-3, University of Illinois Urbana-Champaign.

Two web pages (Mahr 7-3 & Mahr 7-5) in PDF format, found at URL www.buellkft.hu/elemek/1176/millimar—1301—1318—fly—en—2005-11-18.pdf.

Four web pages (Mahr 7-6, Mahr 7-7, Mahr 7-8 & Mahr 7-9) in PDF format, found at URL www.boyida.com.cn/downfiles/20077613133623.pdf.

One web page (Mahr 7-26) in PDF format, found at URL www.marh.com/scripts/relocateFile.php?ContentID=1209&NodeID=5549*FileID=3515&ContentDataID-1502.

* cited by examiner

VACUUM-ACTUATED SPHEROMETER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

A spherometer is a measuring device that can be used to measure the thickness of a workpiece, or in connection with lenses to measure its sagital depth and other physical parameters, such as the radius of curvature of a lens. The measurements are usually made by comparing the amount of linear travel of a probe from a zero reference point to a workpiece. In order to calibrate the spherometer, the zero reference point is established by placing a calibration standard workpiece in the spherometer and measuring the difference between the amount of linear travel of the probe to the calibration standard workpiece and to the workpiece under test.

2. Description of Related Art Including Information Disclosed Under 37 CFR 1.97 and 1.98

A typical spherometer is described in a paper entitled "Measuring The Radius Of Curvature By Means Of A Spherometer," Physics Department, University of Illinois, September 1993, © 1999. Typical formulae used in the calculation of the height of curvature of an object and its radius of curvature are shown in the paper "Spherometer," 3B Scientific GmbH, Hamburg, Germany, www.3bscientific.com.

BRIEF SUMMARY OF THE INVENTION

A spherometer for measuring at least one physical parameter of the workpiece includes at least one fluid-actuated linearly extensible probe member having an output indicative of an amount of linear travel and a chamber housing the linearly extensible probe member. The chamber has an aperture for supporting a workpiece and a vacuum line is coupled to the chamber for creating a vacuum. The probe member is activated as a result of the vacuum in the chamber, causing it to extend linearly toward the workpiece until touching it. The linear extension of the probe may be used as a measurement of distance. The distance measured to a workpiece may be compared to a standard to determine a physical parameter of the workpiece.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
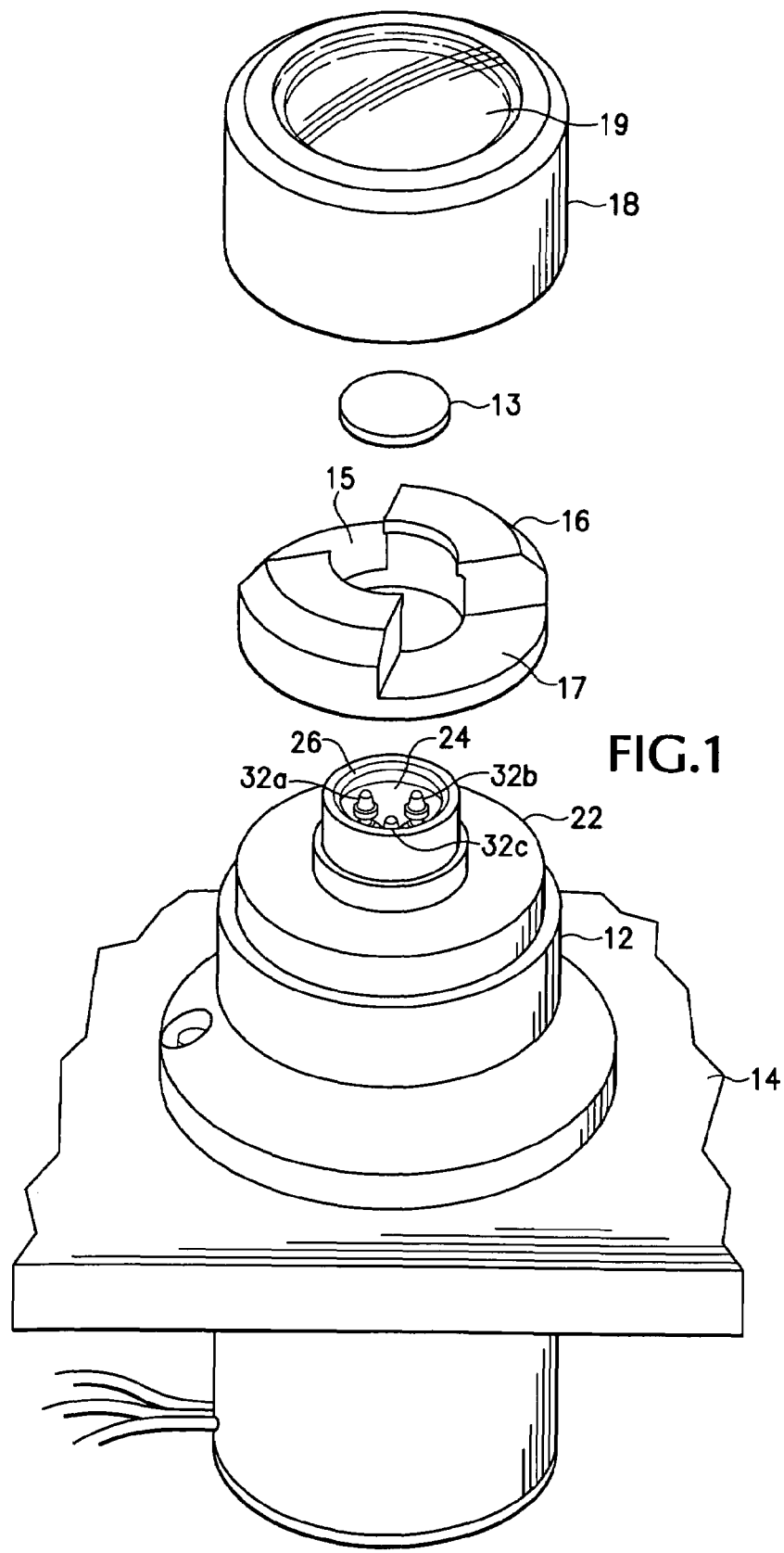
FIG. 1 is an exploded perspective view of a preferred embodiment of a spherometer.

Referring to FIG. 1, a spherometer 10 includes a housing 12, which is rigidly bolted to a surface such as a table 14. The spherometer 10 includes a part guide 16 and a dust cap 18, which may include a lens. The part guide 16 slip-fits over a flange 20 of a contact ring 22. The part guide 16 has cut out portions 15 and 17 that permit a user to place a workpiece 13 into the guide 16 when the guide 16 is placed over the contact ring 22. The contact ring 22 includes an annular opening 24 that has an inner flange 26 for supporting the workpiece 13. A lens 19 in the dust cap 18 allows a user to see inside the device.

Figure 2:
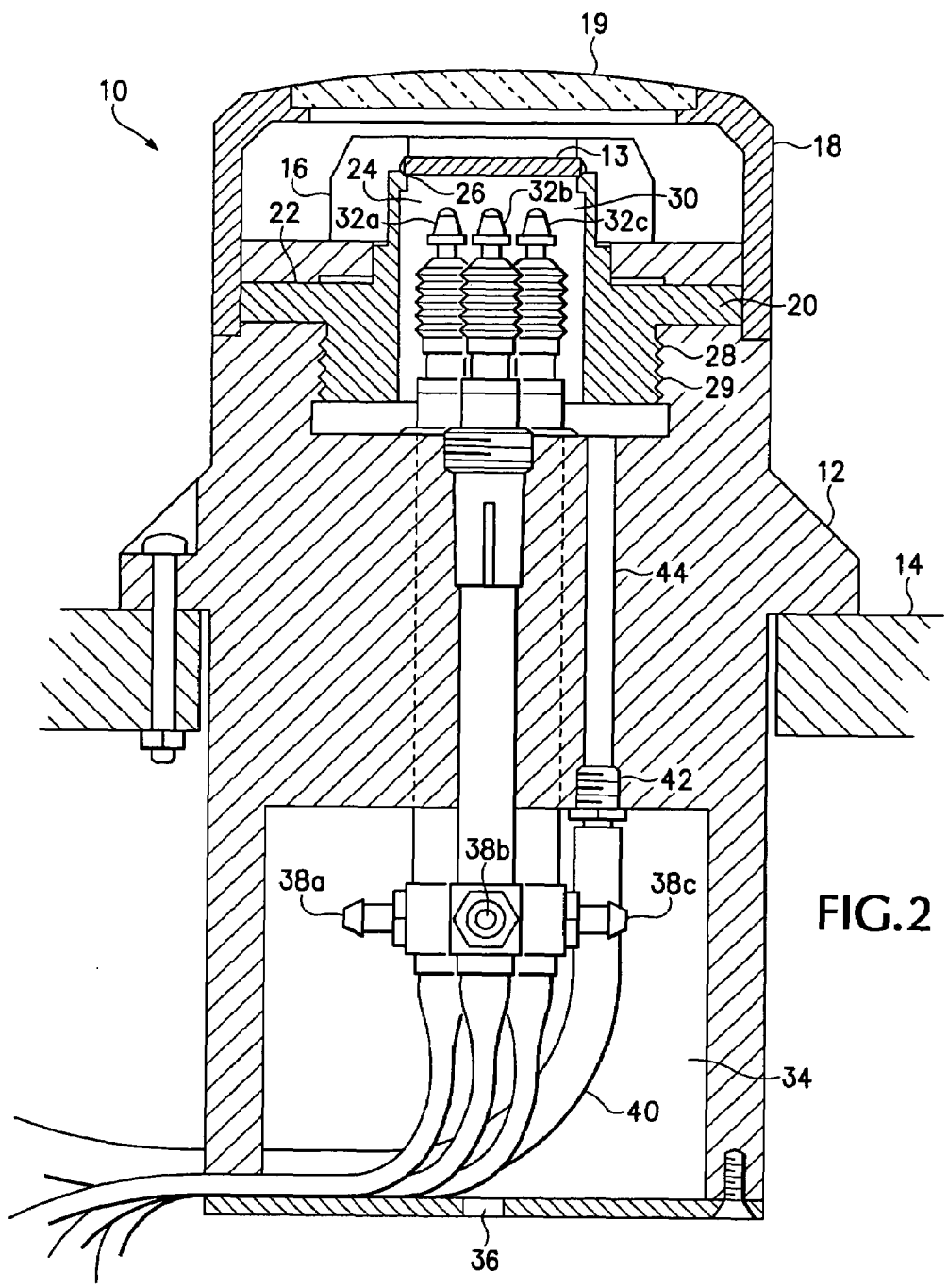
FIG. 2 is a side cutaway view of the spherometer of FIG. 1.

As shown best in FIG. 2, the contact ring 22 has threads 28, which mate with receiving threads 29 formed in the housing 12. The inner cylindrical wall of the contact ring 22 forms a chamber 30.

Three linearly extensible probe members 32a, 32b and 32c have upper ends that include contact tips and an expansible bellows. Inside the bellows are rods (not shown that slide in an axial direction. The probes 32a, 32b and 32c are hollow rods, which extend from the chamber 30 into bores in the housing. The distal ends of the probes are located in a housing chamber 34 that includes a lower aperture 36, which is open to the atmosphere. The distal ends of the probes are coupled to fittings 38a, 38b and 38c, which are open to the chamber 34. Thus, air is free to enter the fittings 38a, 38b and 38c and, as will be explained below, expand the bellows of each. This is the mechanism by which the tips of the probes 32a, 32b, 32c extend and touch the workpiece.

A vacuum line 40 is coupled through a fitting 42 into a bore 44 in the housing. The bore 44 is open into the chamber 30. The vacuum line 40 is powered by any suitable vacuum source, such as a vacuum pump or the like (not shown).

The probes 32a, 32b and 32c may be commercially available linear probes, which extend linearly in response to fluid pressure and provide an electronic output indicative of the amount of linear travel. Examples of commercially available probes of this type are Millimar Inductive Probes available from Mahr Federal, Inc. of Providence, R.I.

When a workpiece is inserted into the aperture 24 through the part guide 16, a hollow air-tight chamber 30 is formed, which is connected through the bore 44 to the vacuum line 40. When the vacuum is activated and the air drawn out of the chamber 30, a pressure differential exists between the chamber 30 and the open chamber 34. In order to attempt to equalize this pressure differential, air will flow into the probe members through the fittings 38a, 38b and 38c causing the tips of the probes 32a, 32b and 32c to extend by way of the bellows until the tips touch the workpiece. The probes will not dislodge the workpiece however because the vacuum holds the workpiece securely against the chambered edge 26 of the opening 24. The amount of linear excursion of the probes 32a, 32b and 32c provides information to a user regarding some physical parameter of the surface of the workpiece. The linear travel of the probe provides an electrical output that can be calibrated to indicate a distance. For example, in the embodiment shown in FIG. 2, deviations from planarity may be determined by comparing measurements provided by the probes when contacting a workpiece subtracted from the same measurements conducted on a known calibration substrate. For example, with three probe members the planarity of the workpiece may be determined. Certain precision components require that the plane of the workpiece be completely flat and that there be no tilt of the planar surface in the horizontal plane. Any tilt may be calculated from the relative positions of the three probes.

Figure 3:
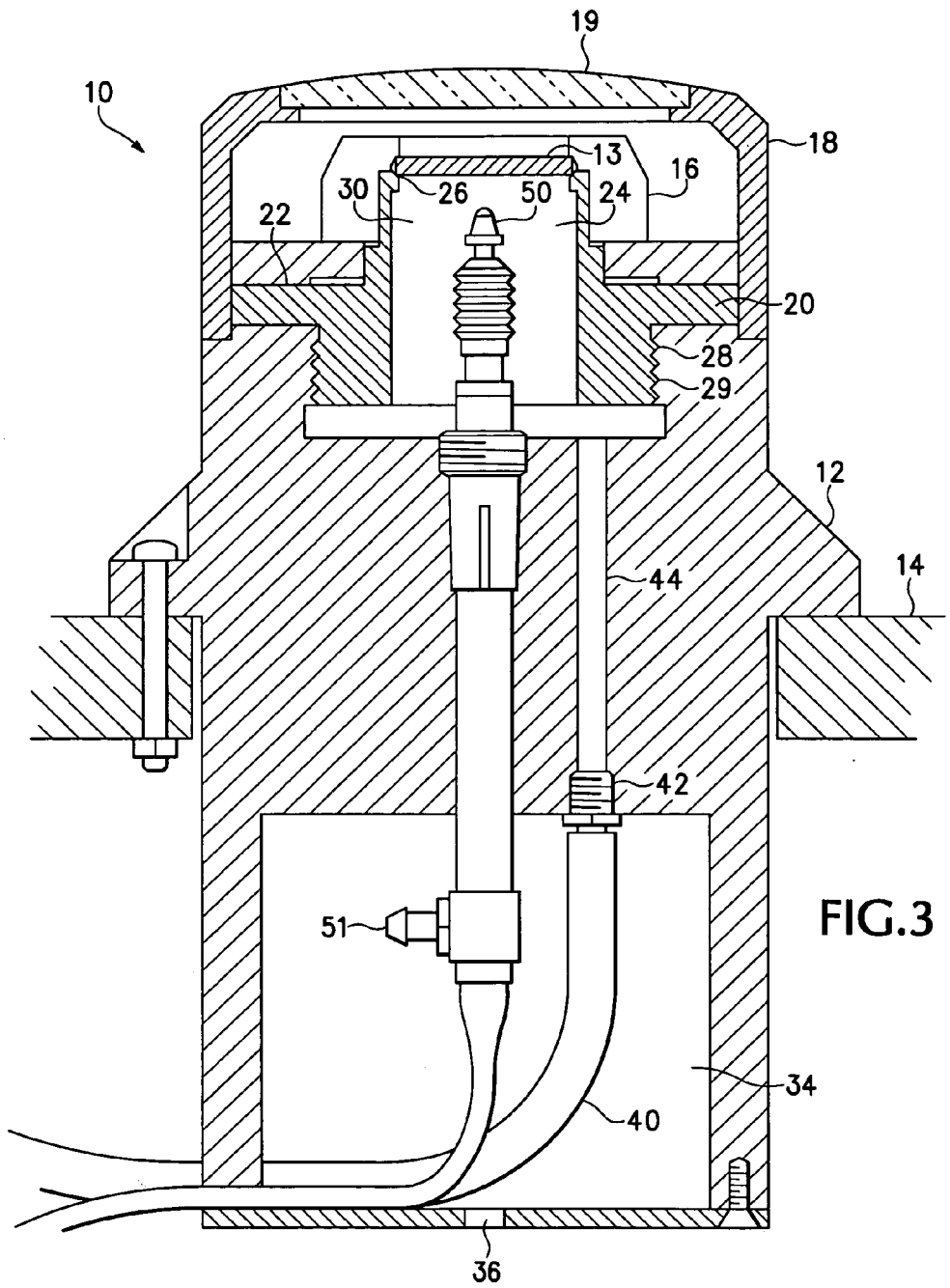
FIG. 3 is a side cutaway view of an embodiment of a spherometer employing a single probe.

In another embodiment (shown in FIG. 3), the same spherometer is fitted with a single probe member 50 with a fitting 51 open to the chamber 34. This probe member is centrally located and thus, using conventional mathematical techniques, the sagital depth of a lens may be determined. Conventional mathematics may be employed because the radius of the opening 24 is known and therefore the height difference between a calibration workpiece and a concave or convex lens substituted as the workpiece may be determined in accordance with conventional formulae.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A spherometer for measuring at least one physical parameter of a workpiece including:
   a) at least one fluid-actuated linearly extensible probe member having an output indicative of an amount of linear travel;
   b) a chamber housing said linearly extensible probe member, said chamber including an annular opening having an edge for supporting a workpiece;
   c) a vacuum line coupled to said chamber for creating a vacuum therein; and
   d) wherein the at least one probe member is activated as a result of said vacuum in said chamber to extend linearly toward the workpiece until touching the workpiece.

2. The spherometer of claim 1 wherein said linearly extensible probe member includes an air inlet located outside the vacuum chamber and exposed to atmospheric pressure.

3. The spherometer of claim 1 wherein said at least one linearly extensible probe member comprises three linearly-extending probe members arranged as points of a triangle.

4. The spherometer of claim 3 wherein said triangle is an equilateral triangle.

5. A spherometer for measuring topographical parameters of a workpiece comprising:
   a) an enclosure including a vacuum chamber, the vacuum chamber having an opening for receiving a workpiece;
   b) at least one probe member extending into said vacuum chamber, the probe member having a linearly extensible portion actuated by the creation of a vacuum in said vacuum chamber; and
   c) a vacuum source coupled to said vacuum chamber for creating a vacuum therein.

6. The spherometer of claim 5 further including two linear probe members mounted so as to extend into said vacuum chamber with said at least one probe member to contact said workpiece at three distinct points.

7. A spherometer for measuring selected physical parameters of a workpiece comprising:
   a) a housing, the housing having a chamber, the chamber including an aperture for receiving said workpiece;
   b) a vacuum line coupled through the housing and into the chamber for selectively establishing negative air pressure therein;
   c) at least one fluid-actuated linearly extensible probe member having an output indicative of an amount of linear travel, the probe member having an extensible portion situated in said chamber and a fluid input located outside said chamber.

8. The spherometer of claim 7 further including a contact ring member having a threaded end for connection to said housing and including inner cylindrical walls defining in part said vacuum chamber.

9. The spherometer of claim 8 wherein said contact ring includes a cylindrical flange for supporting a part guide, said part guide having an annular opening for locating said workpiece in said aperture in said chamber.

10. The spherometer of claim 9 further including a dust cap adapted to fit over said part guide and including a lens fitted into the top of said dust cap.

* * * * *